Figure 1:
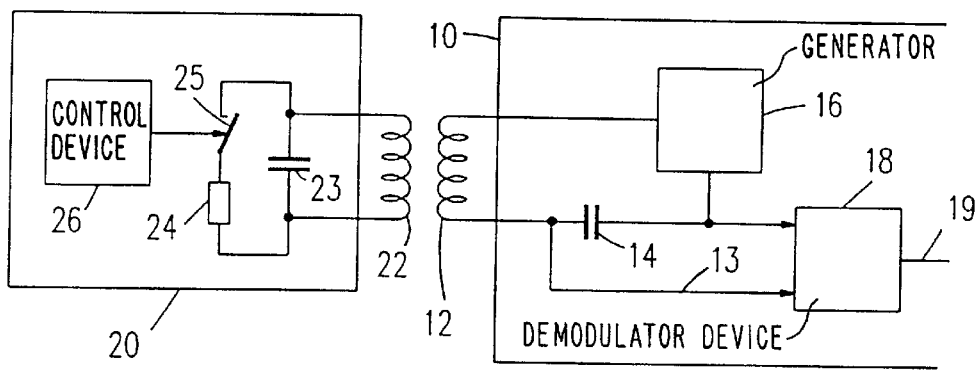

United States Patent [19]
Einfeldt et al.

[11] Patent Number: 6,049,292
[45] Date of Patent: Apr. 11, 2000

[54] METHOD FOR THE TRANSMISSION OF INFORMATION AND BASE STATION FOR RECEIVING OF INFORMATION

[75] Inventors: Walter Einfeldt, Uetersen; Alexander Kirchner, Hamburg; Wolfgang Tobergte, Halstenbek, all of Germany

[73] Assignee: U.S. Philips Corporation, New York, N.Y.

[21] Appl. No.: 08/810,903

[22] Filed: Mar. 5, 1997

[30] Foreign Application Priority Data

Mar. 5, 1996 [DE] Germany .................. 196 08 451

[51] Int. Cl.⁷ ........................................ H04Q 5/22
[52] U.S. Cl. .................... 340/825.54; 340/571; 340/572; 342/51
[58] Field of Search .................... 340/825.54, 825.69, 340/825.72, 825.49, 571, 572; 342/42, 51

[56] References Cited

U.S. PATENT DOCUMENTS 5,235,326  8/1993  Beigel et al. ................. 340/825.54
5,377,226  12/1994  Davis ............................. 375/1
5,616,966  4/1997  Fischer et al. ................ 307/10.5
5,673,037  9/1997  Cesar et al. ................ 340/825.54

*Primary Examiner*—Michael Horabik
*Assistant Examiner*—Anthony A. Asongwed

[57] ABSTRACT

Contactless transmission of information from a passive transponder to a base station takes place in known manner by load modulation in the transponder. The coils of resonant circuits in the base station and in the transponder are coupled to one another, both resonant circuits being tuned as well as possible to the carrier frequency of the base station so that the load modulation of the resonant circuit in the transponder influences the current in the resonant circuit of the base station. Because the two resonant circuits often are not tuned exactly to one another in practice and the transponder is also liable to be moved during the information transmission, it may occur that no signal is recovered by conventional demodulation in the base station. Therefore, according to the invention it is proposed to demodulate an imaginary component and a real component, or different combinations thereof, separately from the antenna signal in the base station and to combine these components by way of a logic circuit which provides notably mutual latching of the two channels. This enables more reliable recovery in the base station of the information transmitted by the transponder.

9 Claims, 3 Drawing Sheets

METHOD FOR THE TRANSMISSION OF INFORMATION AND BASE STATION FOR RECEIVING OF INFORMATION

The invention relates to the contactless transmission of information from a passive transponder, which does not have it own energy source, to a base station via only one coil at each side. The information as well as the energy for operation of the transponder is transmitted via this coil, it being assumed that the transponder includes a non-volatile memory. The transmission of information from the transponder to the base station takes place in that a switchable impedance is connected to the coil in the transponder; this impedance is switched in conformity with the information to be transmitted and the effect of the switched impedance of the transponder on the coil is evaluated in the base station.

A method of this kind is known from DE 32 42 551 C2. Preferably, the coil in the transponder forms part of a resonant circuit which is tuned to the frequency transmitted by the base station so that inter alia a maximum energy transfer takes place from the base station to the transponder. The switchable impedance in the transponder induces amplitude modulation of the signal in the base station which thus acts as a transmitter antenna as well as a receiver antenna.

It has been found that, depending on how well the resonant circuit in the transponder is tuned to the frequency of the base station, on whether the transponder is moved relative to the base station during the information transmission, and also on further influences in the base station, not only pure amplitude modulation of the signal occurs in the antenna coil of the base station; additionally phase modulation may occur and, in given circumstances, the amplitude modulation may even disappear practically completely or it may be reversed. Therefore, if only the amplitude modulation of the signal in the antenna coil of the base station is evaluated, reliable transmission of information from the transponder to the base station is not ensured in all circumstances.

It is an object of the invention to provide a method for the transmission of information from a passive transponder, operating with load modulation, to a base station, which method enables transmission of information with maximum reliability even in unfavorable circumstances.

This object is achieved according to the invention by means of a method in which two different combinations of real component and imaginary component of the antenna signal are separately demodulated from the antenna signal of the base station, said components being separately digitized and the transmitted information of the transponder being recovered from the two digitized components by logic combination. Because in all circumstances either at least an amplitude modulation or at least a phase modulation occurs in the antenna coil of the base station, it is ensured that in the method according to the invention a demodulated signal occurs in at least one of the two demodulated components in practically all circumstances; a demodulated signal occurs in both components in the normal case. The transmitted information can be recovered in practically all cases by logic combination of the two components.

DE 31 46 280 C2 discloses a demodulator for angle modulated and amplitude modulated signals in which two different combinations of real component and imaginary component of the antenna signal are also separately demodulated. The two components, however, are squared in analog fashion and both squared components are algebraically summed so as to determine the envelope of the modulated signal or its square.

The logic combination of the two digitized components of the demodulated antenna signal can be implemented in various ways. A particularly reliable and fail-safe recovery of the transmitted information is achieved by deriving pulses from the edges of both digitized demodulated components of the antenna signal, the pulse of one component which appears earlier in relation to an edge of the demodulated signal inhibiting the next pulse of the other component, the transmitted information being derived from the non-inhibited pulse. It is thus avoided that two pulses are unduly recovered from one pulse received if edges of the two signals which have been shifted by a short period of time occur, for example due to different intensity of the two demodulated components. It is essential in this respect that for each pulse received always the first edge occurring is evaluated, i.e. that automatic and dynamic switching takes place between the two components. The evaluation of the edges of the received demodulated pulses is particularly effective in the case of biphase encoding.

The demodulation of two different combinations of real component and imaginary component of the antenna signal is performed in the simplest way by means of two carrier signals whose phase has been shifted by part of a full carrier oscillation relative to one another. Preferably, use is made of the carrier signal itself as well as of a signal whose phase has been shifted 90° with respect thereto. Thus, on the one hand substantially only the real component and on the other hand substantially only the imaginary component of the antenna signal is demodulated.

A base station operating on the basis of the principle of the method according to the invention includes a carrier signal generator, an antenna coil and a demodulator device which is coupled thereto, and the transponder also includes an antenna coil, a controllable impedance which is coupled thereto, and a control device for controlling the impedance. The demodulator device comprises two branches for the demodulation of different combinations of real component and imaginary component of the antenna signal, a discriminator for generating a binary signal from the demodulated signal, and a decision member for combining the binary signals from the two branches.

Figure 2:
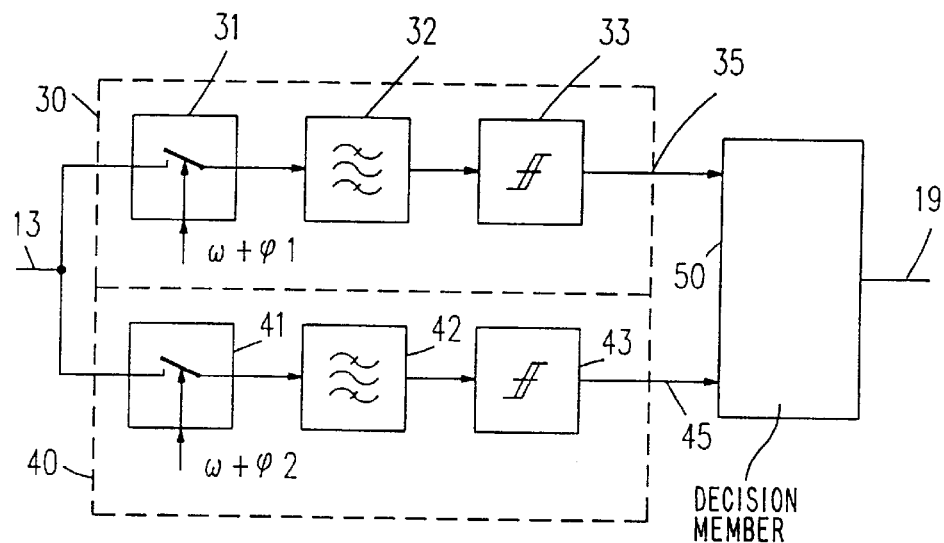
Figure 4:
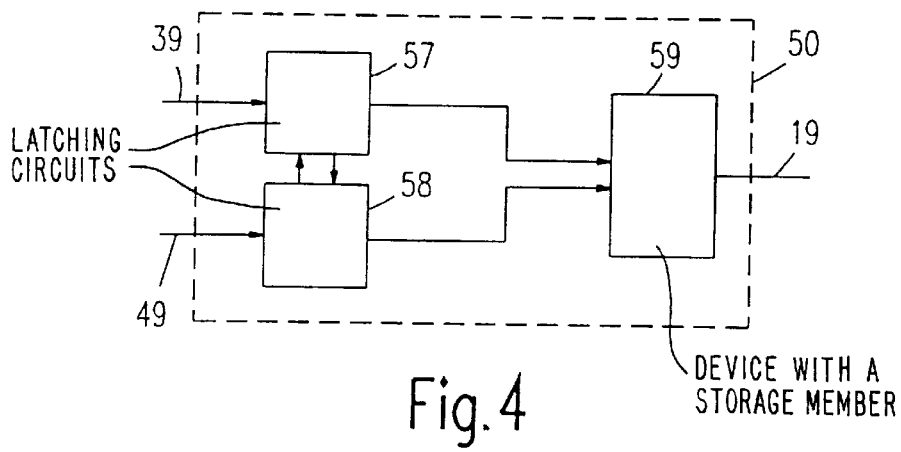
Figure 3:
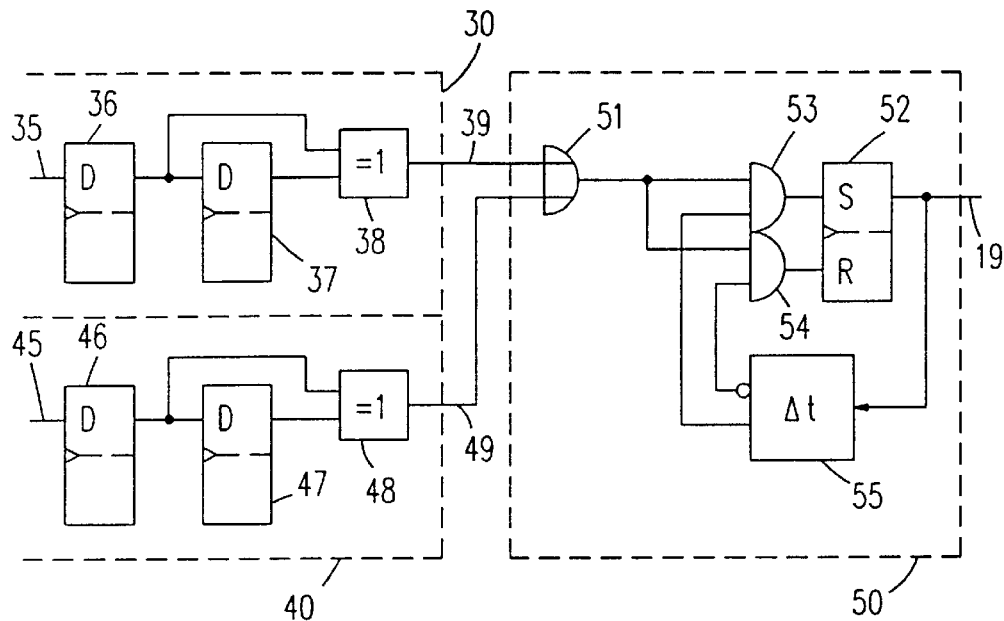
Figure 5:
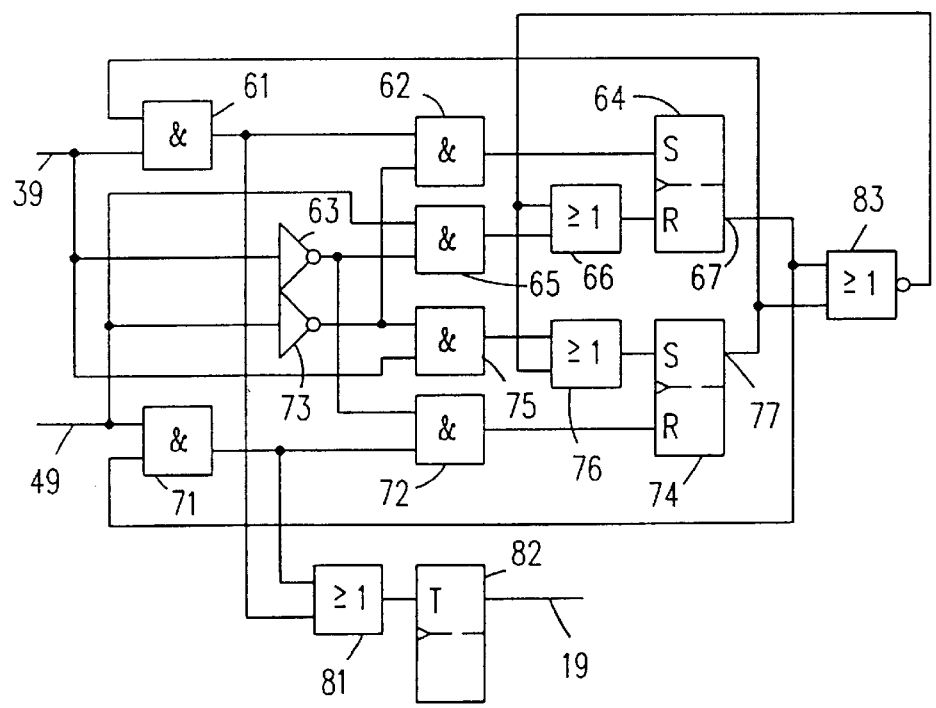
Figure 6:
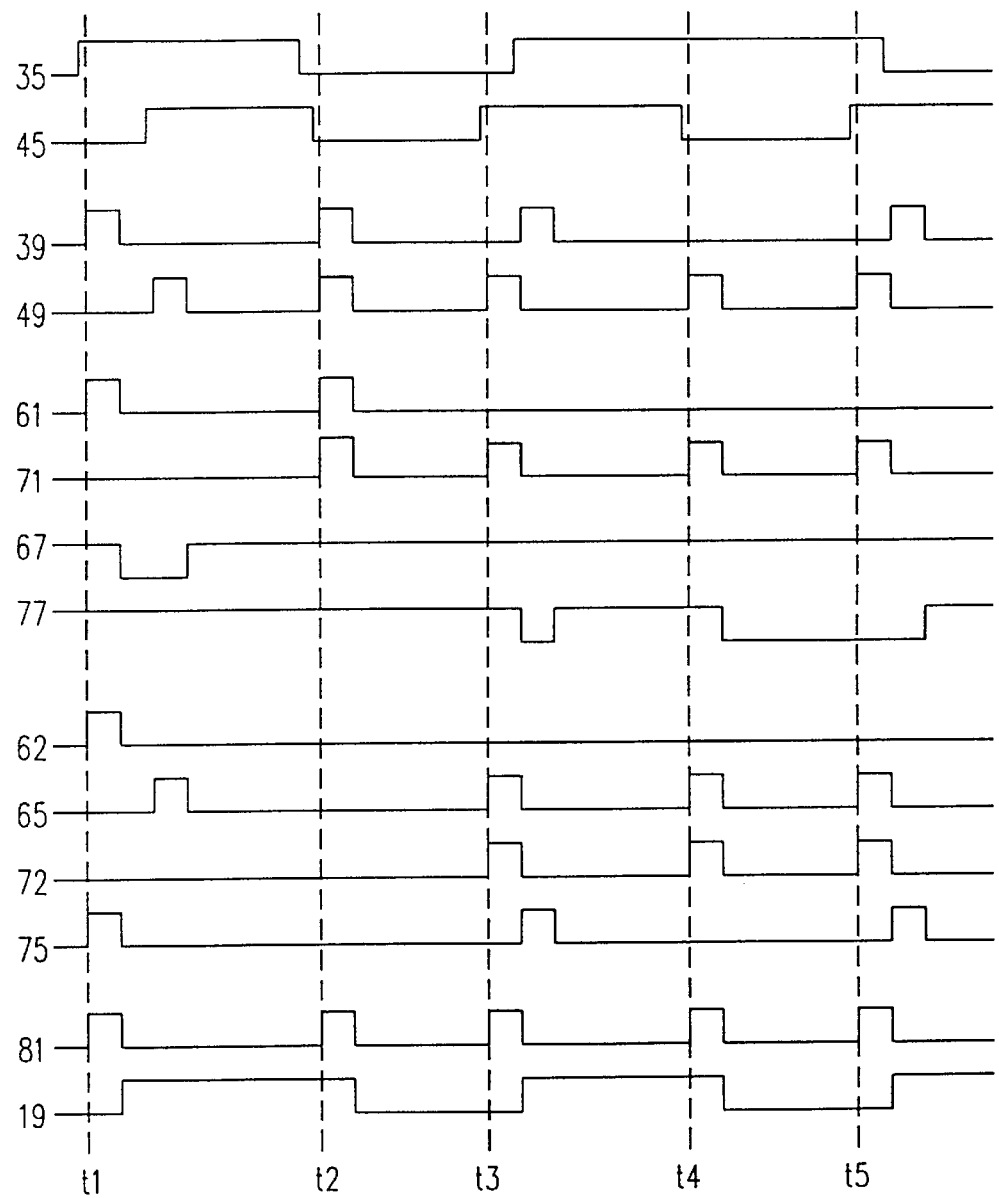

Embodiments of the invention will be described in detail hereinafter with reference to the drawing. Therein:

FIG. 1 shows diagrammatically the principle of the contactless transmission of information from a passive transponder to a base station, FIG. 2 shows diagrammatically the construction principle of a demodulator comprising two branches, FIG. 3 illustrates the generating of edges from the demodulator signal and their evaluation in a decision member, FIG. 4 shows the construction principle of a decision member with mutual latching of the edges of the two branches of the demodulator, FIG. 5 shows a detailed circuit diagram of a decision member as shown in FIG. 4, and FIG. 6 shows a time diagram of various signals occurring in the circuit shown in FIG. 5.

FIG. 1 shows diagrammatically a base station 10 and a transponder 20 which are coupled to one another via coils 12 and 22, respectively. The base station 10 includes a generator 16 for generating a carrier signal, one terminal of which is connected to one end of the coil 12 whereas a reference terminal is connected to the other end of the coil 12 via a capacitor 14. The coil 12 and the capacitor 14 form a series resonant circuit which is tuned to the frequency of the carrier signal of the generator 16.

The junction of the coil 12 and the capacitor 14 is connected, like the reference terminal of the generator 16, to inputs of a demodulator device 18 in which variations of the current in the series resonant circuit are evaluated in order to output the recovered information via an output 19. Further devices for processing the signal on the output 19 in the base station 10 have been omitted for the sake of clarity.

The coil 22 of the transponder 20 is connected parallel to a capacitor 23, resulting in a parallel resonant circuit which is tuned exactly to the frequency of the generator 16 in the ideal case. This resonant circuit is connected to an impedance 24 via a switch 25 which is controlled by a control device 26. The impedance 24 is preferably a resistor or a diode arrangement. The extraction of the electric energy for feeding the control device 26 from the voltage arising in the resonant circuit when the transponder 20 is coupled to the base station 10 and the demodulation of information transmitted from the base station 10 to the transponder 20, for example by phase modulation, have been omitted for the sake of clarity.

The coupling of the two coils 12 and 22 causes a variation of the current flowing in the coil 12 and hence through the capacitor 14 if the switch 25 in the transponder 20 is closed. This variation of the current, causing a variation of the voltage across the capacitor 14, can be evaluated in the demodulator device 18 so that a signal indicating the position of the switch 25 in the transponder can thus be obtained on the output 19. In this manner information is transmitted from the transponder, not having an own energy supply, to the base station 10 in a contactless fashion.

FIG. 2 shows the construction principle of a demodulator device which consists of a demodulator with two branches 30 and 40 and a decision member 50. The signal derived from the antenna coil of the base station is applied, via the lead 13 in each of the branches 30 and 40, to a multiplier circuit 31, 41, in this case being constructed as a sample-and-hold circuit. Each of these circuits includes a switch and the switch of the circuit 31 is briefly closed by means of a sample pulse which appears in synchronism with the carrier frequency $\omega$ but has been shifted through a first phase angle $\psi 1$ with respect thereto. Similarly, the switch of the switch 41 is closed by a periodic sample pulse which also occurs in synchronism with the carrier frequency $\omega$ but has been shifted through a different phase angle $\psi 2$ with respect thereto. In the simplest case $\psi 1=0$ and $\psi 2=90°$, so that in the branch 30 the real component and in the branch 40 the imaginary component of the antenna signal on the lead 13 is evaluated.

Only the branch 30 will be described hereinafter, because the construction and operation of the branch 40 are the same. The signal of the circuit 31 is applied to a bandpass filter 32 which on the one hand removes the DC component, because a large, practically constant component is superposed on the signal produced in the antenna coil 12 by load modulation by the transponder. Moreover, the filter 32 suppresses the signal component of the carrier frequency $\omega$ to a high degree. The manufacture of the filter 32 is comparatively simple because the modulation in the transponder is performed such that the position of the switch 25 is changed only after a plurality of carrier oscillations, so that the highest frequency of the modulated useful signal is substantially lower than the carrier frequency.

The output signal of the filter 32 is applied to a digitization circuit 33 which is preferably constructed as a Schmitt trigger circuit and generates a binary signal on the lead 35 from the analog signal of the filter 32. In the ideal case this signal is a pulse signal which represents the position of the switch 25 in the transponder 20, be it with a small time shift which is induced by the filter 32.

Similarly, in the branch 40 the signal of the circuit 41 is filtered in the filter 42 and converted in the circuit 43 into a binary signal on the lead 45. In the ideal case the signals on the leads 35 and 45 are substantially synchronous but, generally speaking, the amplitudes of the signals output by the filters 32 and 42 are different, so that the Schmitt triggers 33 and 43 switch slightly differently. The decision member 50 must be constructed so that from said usually slightly time-shifted pulses (one of which may also be completely absent) an unambiguous pulse signal is generated on the lead 19, which signal reliably represents the position of the switch 25 or its control.

FIG. 3 shows a circuit which is suitable for this purpose. The two branches 30 and 40 have been extended by some elements which generate a brief pulse in response to each edge of a pulse on the leads 35 and 45. In each branch these additional elements include two D flipflops which are clocked at the carrier frequency, and an exclusive-OR circuit EXOR which is coupled to the outputs of both flipflops. Notably in the branch 30 the pulse signal on the lead 35 is applied to the D input of a D flipflop 36 whose output is connected to the D input of a further D flipflop 37 and to an input of an EXOR 38. The other input of the EXOR 38 is connected to the output of the D flipflop 37. The flipflops 36 and 37 are clock edge controlled, the clock signal having been omitted in FIG. 3 for the sake of clarity.

The first clock signal after the appearance or disappearance of a pulse on the lead 35 switches the D flipflop 36 so that the EXOR 38 receives two different signals on its inputs and supplies an output signal. The next clock signal also switches the D flipflop 37 and the EXOR 38 receives two input signals which are the same, so that no output signal is generated. The D flipflops 46 and 47 and the EXOR 48 in the branch 40 operate in the same way. Therefore, only brief pulses of a duration of one clock period occur on the leads 39 and 49; however, these pulses may have been shifted one or more clock periods in time. The decision member 50 must recover an unambiguous pulse signal therefrom.

To this end, the decision member 50 includes an OR-gate 51 whose inputs are connected to the leads 39 and 49 whose output is connected to a respective input of two AND-gates 53 and 54. The outputs of the AND-gates 53 and 54 are connected to the S-input and the R-input, respectively, of a clocked R-S flipflop 52. The other inputs of the AND-gates 53 and 54 are connected to an output and to an inverting output, respectively, of a delay circuit 55 whose input is connected to the output of the flipflop 52. The delay device 55 consists, for example of a chain of series connected, clocked flipflops.

For explaining the function of the decision member 50 of FIG. 3 it is assumed for the time being that the flipflop 52 produces a low signal on the output, and hence also on the lead 19, and that the delay time of the delay device 55 has elapsed so that a high signal is applied to the lower input of the AND-gate and a low signal is applied to the lower input of the AND-gate 54. If a pulse occurs on one of the two leads 39 and 49, or simultaneously on both leads, it is applied to the S-input of the flipflop 52, via the OR-gate 51 and the AND-gate 53, so that in response to the next signal on the clock input the state of this flipflop changes and the lead 19 carries a high signal. During the delay time of the delay device 55, however, its output state is maintained so that pulses on the leads 39 and 49 with a temporal shift shorter than the delay time do not change the state of the flipflop 52. It is only after the delay time of the delay device 55 has elapsed that its output state changes, so that the lower input of the AND-gate 53 receives a low signal and the lower input of the AND-gate 54 receives a high signal; a pulse subsequently occurring on the leads 39 and 49 switches the flipflop 52 over again. The delay time of the delay device 55, therefore, is chosen to be equal to approximately half the minimum duration of the pulses with which the control device 26 in the transponder drives the switch 25, said minimum pulse duration being defined as numbers of carrier oscillations.

This maximum time shift of the pulses on the leads 39 and 49 with respect to one another for the same pulse transmitted by the transponder, however, cannot be reliably maintained in given circumstances. Therefore, FIG. 4 shows a decision member in which the time shift of the pulses with respect to one another is practically not limited. To this end, each of the leads 39 and 49, on which the brief pulses derived from the signal edges occur, is connected to an associated latching circuit 57, 58, which circuits are also coupled to one another. The construction of the latching circuits 57 and 58 is such that a pulse which first appears on one of the two leads 39 or 49 suppresses the subsequent pulse on the other lead. Only the non-suppressed pulse appears on the output of the relevant latching circuit and is applied to a device 59 which includes a storage member which changes its signal state in response to each pulse arriving. Consequently, for each pulse edge of the demodulated pulses received only one pulse edge is produced on the output lead 19.

FIG. 5 shows an example of a pair of such latching circuits which latch one another. Therein, the elements 61 to 65 represent the latching circuit 57 of FIG. 4 and the elements 71 to 75 represent the latching circuit 58 of FIG. 4. The construction of the two latching circuits is thus identical. They include a respective AND-gate 61, 71, an input of which is connected to the lead 39, 49, respectively, a second input thereof receiving an inhibit signal as will be explained hereinafter. The non-inhibited pulses then occur on the output of the gates 61 and 71, said pulses being applied to a T-input of a clocked T-flipflop 82 via an OR-gate 81. The recovered received pulses then occur on the output of this flipflop 82 and hence on the lead 19. The elements 81 and 82 together implement the block 59 in FIG. 4.

The output of the AND-gate 61 is also connected to an input of an AND-gate 62, the other input of which is connected, via an inverter 73, to the lead 49 for the pulses of the other demodulator branch. The output of the AND-gate 62 is connected to an S-input of a clocked R-S flipflop 64.

Also provided is an AND-gate 65, one input of which is connected directly to the lead 49 whereas its other input is connected to the lead 39 via an inverter 63. The output of the AND-gate 65 is connected, via an OR-gate 66, to an R- input of the R-S flipflop 64.

Analogously, the output of the AND-gate 71 is also connected to an input of an AND-gate 72, the other input of which is connected to the output of the inverter 63, its output being connected to an S-input of an R-S flipflop 74. One input of an AND-gate 75 is connected directly to the lead 39 and the other input of the AND-gate 75 is connected to the output of the inverter 73, the output of the AND-gate 75 being connected, via an OR-gate 76, to the R-input of the flipflop 74. The output 67 of the flipflop 64 supplies the inhibit signal for the lower latching circuit and is connected to the one input of the AND-gate 71; analogously, the output 77 of the flipflop 74 supplies the inhibit signal for the upper latching circuit and is connected to an input of the AND-gate 61. The outputs 67 and 77 are also connected to the two inputs of a NOR-gate 83 which is connected to further inputs of the OR-gates 66 and 76 in order to prevent both outputs 67 and 77 from carrying a low potential, because otherwise both latching circuits would be blocked in this signal state.

The function of the circuit shown in FIG. 5 will be described in detail hereinafter with reference to the time diagram of FIG. 6, that is to say for various time shifts of the pulses on the leads 39 and 49 and also for the case where one of the pulses is completely absent. The numbers stated for the individual signal waveforms indicate the elements on the output of which these signals occur, or the outputs themselves.

The top of FIG. 6 shows the demodulated pulses which occur on the leads 35 and 45 in the FIGS. 2 and 3. Below, there are shown the pulses which are derived therefrom in the left-hand part of the circuit shown in FIG. 3 and which appear on the leads 39 and 49. Each of these pulses commences at the first clock signal edge occurring after the corresponding pulse edge on the lead 35, 45 and has a duration of exactly one clock period as can be established on the basis of the circuit shown in FIG. 3 and the foregoing description.

At the instant t1, at which the first pulse shown appears on the lead 39, both flipflops 64 and 74 are in the reset state so that both outputs 67 and 77 carry a high potential. Consequently, this first pulse appears on the output of the AND-gate 61 and also on the output of the AND- gate 62, because the signal on the lead 49 is low and enables the AND-gate 62 via the inverter 73. Consequently, a high potential is present on the S-input of the flipflop 64 and in response to the next clock signal the flipflop 64 is switched so that the output 67 becomes low. Moreover, the first pulse on the lead 39 appears on the output of the AND-gate 75 because the lead 49 is low at that instant and enables the AND-gate 75, which pulse reaches the R-input of an R-S flipflop 74 via an OR-gate 76. However, because this flipflop was assumed to be in the reset state, the state of this flipflop remains the same when the next clock signal appears.

Due to the low signal on the output 67, the AND- gate 71 is blocked so that the pulse subsequently occurring on the lead 49 is not conducted by its output. However, this pulse appears on the output of the AND-gate 65, because the signal on the lead 39 is then low again and enables the AND-gate 65 via the inverter 63. Therefore, a high signal is then present on the R-input of the flipflop 64 and the flipflop is switched again in response to the next clock signal, so that a high signal appears again on the output 67.

Thus, the first pulse appearing is conducted whereas the next pulse appearing is inhibited and the outputs 67 and 77 are in their original signal state again, so that subsequently the first pulse appearing can be conducted again.

In the present example a respective pulse appears simultaneously on the leads 39 and 49 at the instant t2. Both pulses are then conducted by the AND-gates 61 and 71, but now the AND-gates 62 and 72 as well as the AND-gates 65 and 75 are blocked, via the inverters 63 and 73, respectively, so that the state of the flipflops 64 and 74 does not change. The fact that pulses are simultaneously conducted by the AND- gates 61 and 71, however, is not disturbing because these pulses are combined by the OR-gate 81 and appear as one pulse on the output thereof as is shown in FIG. 6. Because this pulse is applied to the T-input of the flipflop 82, the latter is switched over in response to the next clock signal, so that a signal waveform as shown at the bottom of FIG. 6 occurs on the lead 19.

At the instant t3 first a pulse appears on the lead 49, which pulse is conducted by the AND-gate 71 and also by the AND-gate 72 because at that instant a low signal is present on the lead 39, which signal enables the AND-gate 72 via the inverter 63. Therefore, the S-input of the flipflop 74 carries a high signal and this flipflop switches over in response to the next clock signal so that the output 77 becomes low and blocks the AND-gate 61. The pulse also appears on the output of the AND-gate 65 and hence also on the R-input of the flipflop 64; however, because the latter is still in the reset state, this state does not change after the next clock signal. Due to the blocking of the AND-gate 61, the next pulse on the lead 39 cannot appear on the output thereof. However, this pulse appears on the output of the AND-gate 75, because this gate has been enabled via the inverter 73 so that a high signal is present on the R-input of the flipflop 74 and switches over the flipflop so that the signal on the output 77 becomes high again.

At the instant t4 a pulse appears again on the lead 49, which pulse is conducted by the AND-gate 71 and also by the AND-gate 72 so that the flipflop 74 switches over again and the output 77 becomes low again. As opposed to the foregoing case, the pulse which is also conducted by the AND- gate 65 does not change the state of the flipflop 64 because this flipflop is still in the reset state.

In the present example it is assumed that initially no pulse appears on the lead 39, since the signal on the lead 35 remains constant. This may occur if unfavorable circumstances cause the modulation of the transponder to have an effect only in the real component or only in the imaginary component of the antenna signal. Due to the missing pulse on the lead 39, in that case no pulse appears either on the output of the AND-gate 65 and the flipflop 74 remains in the set state in which the signal on the output 77 is low.

At the instant t5 a pulse appears again on the lead 49, which pulse is conducted by the AND-gate 71 and also by the AND-gate 72, however, without influencing the state of the flipflop 74 because the latter is still in the set state. Subsequently, it is again assumed that a pulse appears on the lead 39, which pulse is not conducted by the AND-gate 61 but appears on the output of the AND-gate 75. Consequently, the flipflop 74 is switched back again in response to the next clock signal and the output 77 carries a high signal again. As a result, the same situation is obtained as before the instant t1, i.e. after the instant t5 the next pulse on one of the two leads 39 or 49 is conducted again in conformity with the explanation given for the instants t1 to t3.

Each conducted pulse appears on the output of the OR-gate 81 and hence on the T-input of the flipflop 82, so that the signals transmitted by the transponder are recovered again on the output 19, even if no signal or no pulse edge is demodulated in one of the two branches of the demodulator.

We claim:

1. A method for transmission of information from a transponder to a base station, where a constant carrier signal is applied to an antenna coil in the base station and where in conformity with the information to be transmitted a field transmitted by the antenna coil is attenuated in the transponder which is inductively coupled to the base station, two different combinations of a real component and an imaginary component of the antenna signal being separately demodulated from an antenna signal at the antenna coil, said components being separately digitized, and the transmitted information of the transponder being recovered from the digitized components by a logic combination of pulses that are derived from edges of said digitized antenna signal components, a pulse of one of said components which appears earlier in relation to an edge of a demodulated signal inhibiting a next pulse of another one of said components, and the transmitted information being derived from a non-inhibited pulse.

2. A method as claimed in claim 1, wherein demodulation is performed by means of two carrier signals whose phase has been phase shifted by a part of a full carrier oscillation relative to one another.

3. A base station for receiving information transmitted from a transponder including a generator for generating a carrier signal having at least briefly a constant frequency and amplitude a first antenna coil which is coupled to the generator, a demodulator device which is coupled to the antenna coil and outputs demodulated information, the transponder including a second antenna coil which is inductively coupled to the first antenna coil, and an impedance which is coupled to the second antenna coil, and controllable in conformity with the information to be transmitted, the demodulator device comprising two branches, each of which includes a demodulator for demodulating in a respective one of said branches a different combination of a real component and an imaginary component of a signal derived from the first antenna coil, and includes a discriminator for forming a binary signal from a demodulated signal in the respective one of said branches, in each of said branches the discriminator including an edge detector for forming a pulse with a pulse duration which is substantially shorter than a shortest distance between an edge of a binary signal in the respective one of said branches from each an edge of a binary signal of another one of said branches, and the demodulator device comprising a decision member which is coupled to said branches for forming the demodulated information from a combination of the binary signals in said branches of the device, and that the decision member including a combination circuit with inputs for the pulses of the branches and an output for supplying a combined pulse, and a bistable storage circuit which is coupled to the output, in response to the combined pulse, the storage circuit changing a signal state.

4. A base station as claimed in claim 3, wherein the storage circuit is constructed as an R-S flipflop having at least one output, an R and an S input of the R-S flipflop being preceded by a respective gate, a first input of each gate being coupled to the output of the combination circuit and a second input of each gate being coupled, via a delay circuit, to the output of the R-S flipflop, and wherein the output of the R-S flipflop forms an output of the demodulator device.

5. A base station as claimed in claim 3, wherein the decision member includes a latching for the pulses of the branches for enabling a first pulse in one branch of said branches and for inhibiting a subsequent second pulse in another one of said branches, followed by enabling of a third pulse in one of the branches, and wherein the combination circuit receives enabled pulses of the branches as the demodulated information.

6. A base station as claimed in claim 5, wherein the latching circuit comprises two sections of identical construction, each of which sections includes an input for pulses of another one of the branches, each of the sections including a first gate with an output and two inputs, one of which is connected to an associated input for pulses, an R-S flipflop with two inputs and at least one output, one input of the R-S flipflop being connected to the output of the first gate, and the output of the R-S flipflop being coupled to an input of the first gate of the other section, a second gate with two inputs and one output, one input of the second gate being coupled to the associated input for the pulses in the section, and another input of the second gate being coupled to another one of the associated inputs, the output being coupled to another input of the R-S flipflop, that the outputs of the first gates (61, 71) are connected to the inputs of the combination circuit (81), and wherein the bistable storage circuit (82) is a T-flipflop with a T-input which is connected to the output of the combination circuit.

7. A base station as claimed in claim 6, wherein in each section of the latching circuit the output of the first gate is coupled to an input of a third gate, a second input of which is coupled to the input for the pulses of the other section and an output of which is connected to the one input of the R-S flipflop.

8. A base station as claimed in claim 3, the demodulator of each branch includes a sample-and-hold circuit, the sample-and-hold circuits in the two branches being driven at different instants within each oscillation period of the carrier signal.

9. A base station for receiving information transmitted by a transponder that is inductively coupled to said base station, said base station comprising:

a generator for generating a constant carrier signal;

a base station antenna coil for inductively coupling to a transponder antenna coil comprised in said transponder, said constant carrier signal being transmitted to said transponder through said base station antenna coil thereby creating a field, and said transponder further comprising means for attenuating said field in accordance with information transmitted through said transponder antenna coil;

separating and demodulating means for separating two different combinations of a real component and an imaginary component from an antenna signal received by said base station antenna coil in response to said transmitted information so as to obtain separate combinations, and for demodulating said separate combinations so as to obtain separately demodulated combinations;

digitizing means for separately digitizing said separately demodulated combinations so as to obtain separately digitized components;

pulse deriving means for deriving pulses from edges of said separately digitized components;

inhibiting means for inhibiting by a pulse that appears earlier with respect to an edge of one said separately digitized components of a next pulse corresponding to another one of said separately digitized components; and recovering means for recovering said transmitted information from pulses that are not inhibited by said inhibiting means.

* * * * *